United States Patent [19]
Schindler et al.

[11] 3,873,759
[45] Mar. 25, 1975

[54] ELECTRICAL ENCLOSURE KNOCKOUT STRUCTURE

[75] Inventors: Edgar C. Schindler; John C. McEachron, both of Puyallup, Wash.

[73] Assignee: Nelco Corporation, Orting, Wash.

[22] Filed: Oct. 30, 1973

[21] Appl. No.: 411,163

Related U.S. Application Data

[60] Continuation-in-part of Ser. No. 265,341, June 22, 1972, which is a division of Ser. No. 69,266, Sept. 3, 1970, Pat. No. 3,701,451, and a continuation-in-part of Ser. No. 280,720, Aug. 14, 1972.

[52] U.S. Cl. .................................. 174/65 R, 220/27
[51] Int. Cl. ............................................. H02g 3/08
[58] Field of Search ....... 174/65 R, 53; 220/27, 3.2, 220/3.3, 3.9

[56] References Cited
UNITED STATES PATENTS

| | | | |
|---|---|---|---|
| 832,509 | 10/1906 | Slocum | 220/27 |
| 1,121,291 | 12/1914 | Robinson | 220/27 X |
| 1,264,450 | 4/1918 | Sweet | 220/27 |
| 1,709,187 | 4/1929 | Newman et al. | 220/27 |
| 2,380,793 | 7/1945 | Rugg | 220/3.9 |
| 2,959,633 | 11/1960 | Palmer et al. | 220/3.2 X |
| 3,176,869 | 4/1965 | Kinney | 220/3.9 |
| 3,701,451 | 10/1972 | Schindler et al. | 174/51 |
| 3,770,873 | 11/1973 | Brown | 174/53 X |

*Primary Examiner*—C. L. Albritton
*Assistant Examiner*—David A. Tone
*Attorney, Agent, or Firm*—Harold J. Rathbun; Ernest S. Kettelson

[57] ABSTRACT

An electrical enclosure having an aperture in one wall with a substantially plainform knockout tongue that projects from the wall structure of the enclosure adjacent the aperture, and disposed so that a surface thereof faces relatively outside of the enclosure at the aperture forming a portion of the outside surface of the enclosure. The outside surface of the enclosure has an identation formed therein, adjacent the juncture of the outer facing surface of the tongue with the wall structure. The indentation provides a line of stress concentration assuring that the tongue will fracture along the line when the tongue is bent inwardly into the interior of the enclosure. In one preferred embodiment the outer facing surface of the tongue is substantially coplanar with the inner-facing surface of the aforementioned said one wall with one peripheral edge of the tongue terminating along a line disposed substantially at the rim of the aperture. The peripheral edge of the tongue is inclined to the plane of the inner-facing surface of the one wall at said line, and forms a corner-like indentation with the inner-facing surface of the one wall, the apex of which is disposed substantially on the line. The indentation faces into the chamber so as to be accessible to the pointed tip of a prying tool introduced into the chamber through the front opening of the enclosure, and may be open to define a tool-receiving slot or may have a means at the apex thereof, at or between the line and the one edge of the one wall, which is readily pierceable by the tip of the tool, to enable the tool to be inserted in the aperture from the chamber, and applied against the outer facing surface of the tongue for removal of the tongue.

21 Claims, 24 Drawing Figures

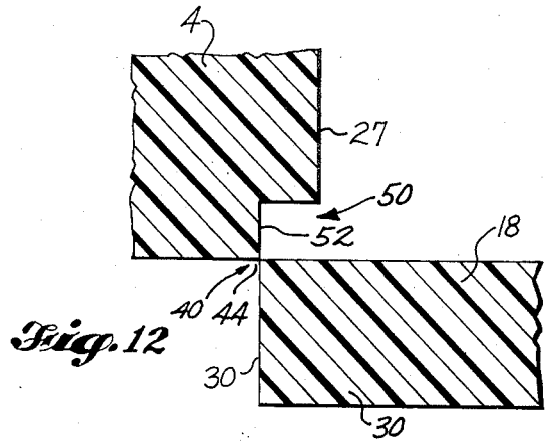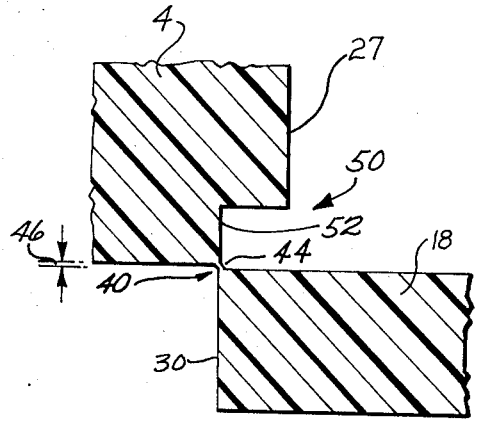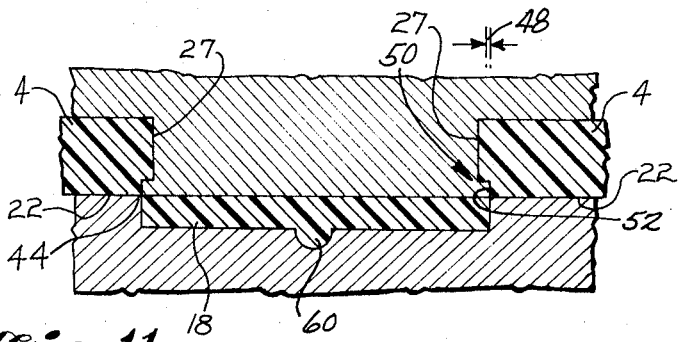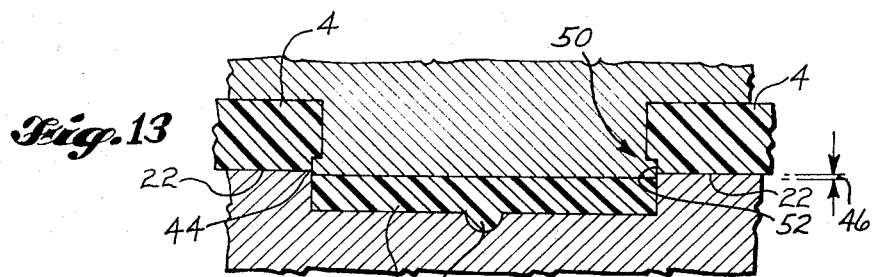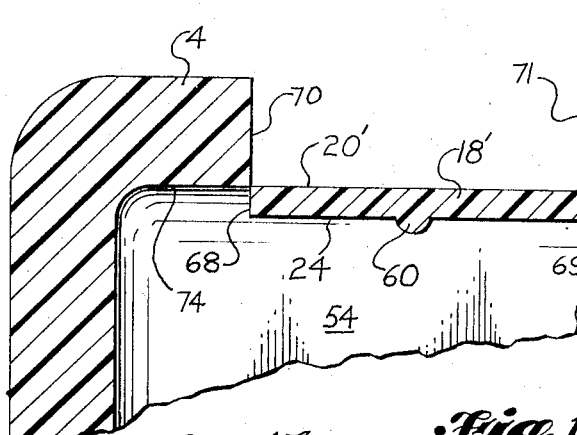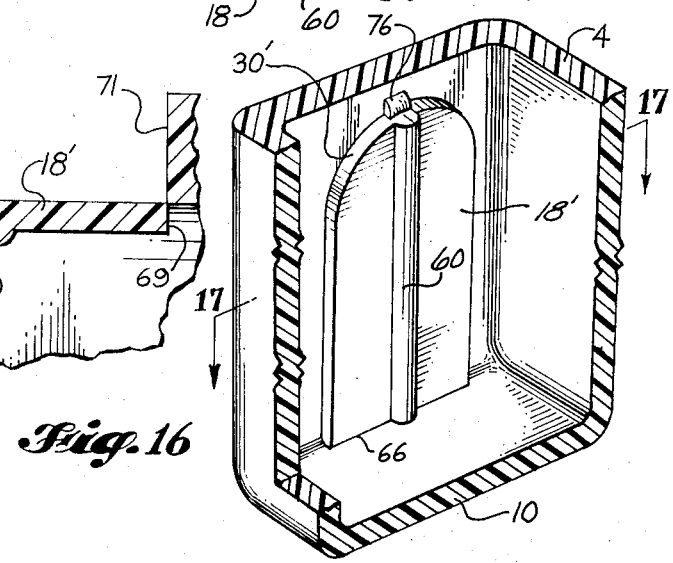

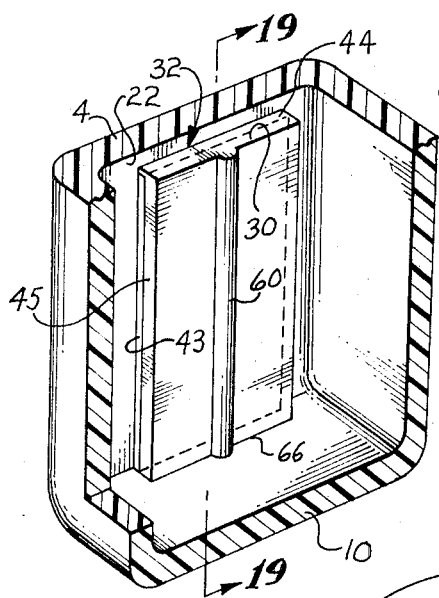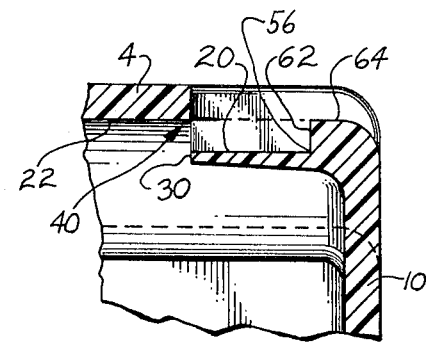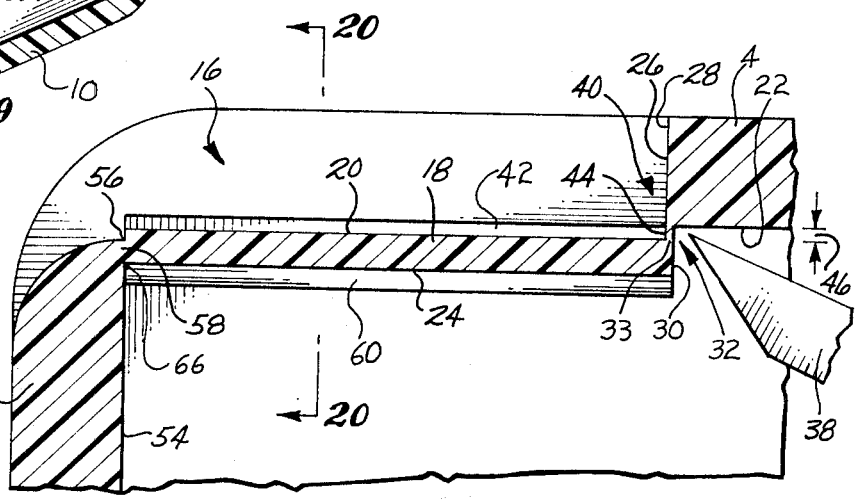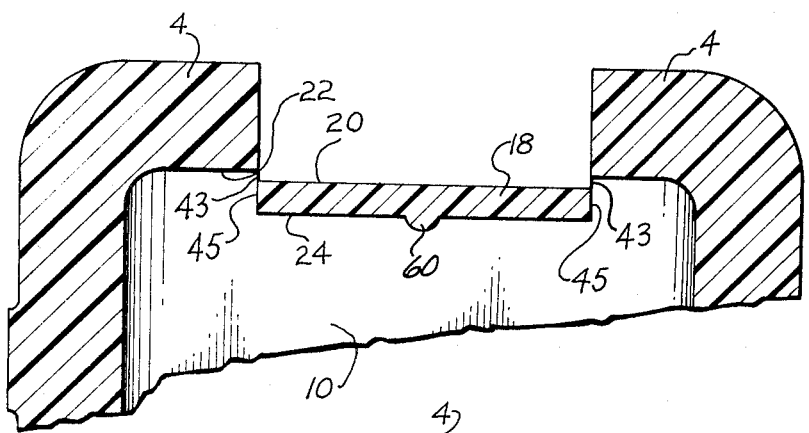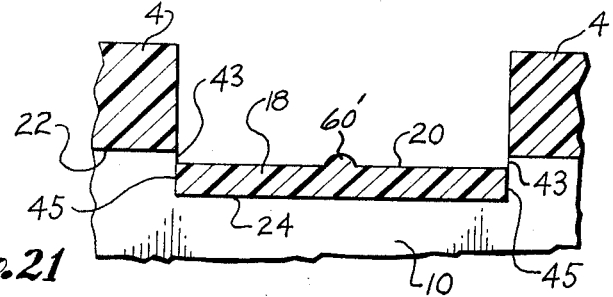

3,873,759

ELECTRICAL ENCLOSURE KNOCKOUT STRUCTURE

RELATED APPLICATIONS:

This application is a continuation-in-part of our co-pending applications Ser. No. 265,341, filed June 22, 1972, and entitled "MOLDED ELECTRICAL JUNCTION BOX" and Ser. No. 280,720, filed Aug. 14, 1972, and entitled "INJECTION MOLDING TECHNIQUE, MOLD STRUCTURE, AND ARTICLES FORMED THEREWITH." Application Ser. No. 265,341 is a division of application Ser. No. 69,266, filed Sept. 3, 1970, now U.S. Pat. No. 3,701,451, under the same title. The disclosures of all three applications are hereby expressly incorporated herein by reference as if fully set forth herein.

THE INVENTION IN GENERAL

The present invention relates to a knockout structure for electrical enclosures such as outlet boxes, and in particular to a knockout structure for those boxes which have a wall structure defining front-to-rear walls and a back wall interconnected therebetween, which together define a chamber within the box which opens to the ambient surroundings of the box through the front thereof.

Each of the above-cited applications discloses a knockout structure in which the knockout aperture has a substantially planiform knockout tongue adjacent thereto. The tongue projects from the wall structure of the box, and is disposed so that a surface thereof faces relatively outside of the box at the aperture, and forms a portion of the outside surface of the box. Thus, the tongue may be removed from the wall structure by applying a force to the tongue in the direction of the interior of the chamber. This force may be applied to the tongue from a point outside of the box, or by introducing a prying tool into the chamber of the box through the front opening thereof, inserting the tool into the aperture through a slot means at one edge of the tongue, and then applying the tool against the outer facing surface of the tongue forcing the tongue inwardly to shear the tongue at its base.

The above-cited applications disclose that the structure of the knockout enables the knockout tongue to be separated cleanly from the box along a predetermined line of fracture adjacent the juncture of the tongue with the wall structure. Thus, by projecting the tongue from a point substantially on or beyond the rim of the aperture, it is possible to assure the user that when he removes the tongue it will fracture at the proper location and be removed from the aperture in a single piece. In addition, the rim will be substantially free of jagged points and sharp edges which might otherwise fray the wire or cable which is threaded through the aperture during the wiring operation.

The present invention is also directed to a knockout structure wherein the knockout tongue is disposed so as to substantially close the knockout aperture to the chamber, yet the tongue is also readily removable by a procedure such as prying which is effected through the inside of the box. This new structure has the advantage thet there is no longer an open slot through which dust or the like can infiltrate into the chamber through the knockout aperture. The new structure also has the advantage that the tongue no longer projects substantially into the main portion of the chamber, and reduction of the effective volume of the chamber is minimized. Furthermore, the new structure has the advantage that the tongue can be separated from the box by a simple thrust of a knockout tool, without the necessity for adding a twist as well, since according to the newly presented embodiment of the present invention, the operative surfaces for the knockout tongue removal operation are arranged in close proximity to one another, so that a "wedging effect" can be achieved by the thrust of the tool, and this effect alone will usually exert a sufficient force on the tongue to fracture the tongue along a line at its base and separate it from the box.

Other advantages will become apparent as the invention is described in greater detail.

OBJECTS OF THE INVENTION

It is one object of this invention to provide a knockout structure for electrical enclosures.

It is a second and related object of this invention to provide a knockout structure for electrical enclosures molded from a plastic material which knockouts may be easily removed from the interior of the enclosure.

It is a further object of this invention to provide a knockout structure which may be easily removed from the surrounding electrical enclosure wall structure at a predetermined location and in a single unit.

A still further object of this invention is to provide a knockout structure for electrical enclosures having a surface discontinuity at the base thereof, which acts as a stress concentration location to insure fracture of the knockout tongue at the proper location.

Another object of this invention is the provision of an interiorly accessible knockout structure which occupies a minimum of the chamber volume of an electrical enclosure.

A still further object of this invention is a knockout for an electrical enclosure which is sealed to the ambient by means of thin flashings along peripheral edges thereof to the adjacent wall structure but which is removable by a simple manipulation from the interior of the enclosure.

A specific object of this invention is the provision of a stress concentrating surface discontinuity along a portion of the outer facing surface of a knockout for an electrical enclosure which causes fracture at the discontinuity when the knockout is bent inwardly.

SUMMARY OF THE INVENTION

In general, certain of these advantages are realized through the fact that the outside surface of a knockout tongue in an electrical enclosure such as an outlet box has a surface discontinuity thereon positioned adjacent the juncture of the outer facing surface of the tongue with the wall structure, whereby the tongue fractures along a line intersecting the discontinuity when an inwardly directed force is applied to the knockout tongue. Put another way, the outside surface of the box has an indentation, fracture line or other suitable surface discontinuity adjacent the juncture of the outer facing surface of the tongue with the wall structure, and the indentation typically forms a shoulder-like step between the outer facing surface of the tongue and the adjoining portion of the outside surface of the box. The tongue structure causes forces acting inwardly on the tongue to concentrate fracture-producing stresses at the shoulder of the step, so that the resulting line of fracture intersects the base of the shoulder. Preferably, the shoulder is substantially right angular to the outer facing surface of the tongue, or otherwise sharply angled thereto so as to make the point of intersection even more precise. In one preferred embodiment the tongue also has a surface thereon which faces inside of the box at the chamber and forms a sharply angled corner with the wall structure adjacent the juncture of the interior surface of the tongue with the wall. In this way, the line of fracture can be certain to follow a predetermined course between the step and the corner. In the presently preferred embodiments of the invention, the aperture is disposed in a corner of the box defined by the one wall and an adjoining wall which coterminates with the tongue at the aperture, and the inner facing surface of the tongue forms a corner of the chamber with the inside surface of the adjoining wall. Moreover, as disclosed in the above-cited applications, one of the inner and outer facing surfaces of the tongue has a rib raised thereon which extends transversely of the tongue and terminates at the corner of the chamber or the step, respectively. The rib lends longitudinal reinforcement to the tongue, and further assures that the full length of the tongue is separated from the box when the knockout operation is effected.

Certain other advantages of the invention are realized by the fact that the outer facing surface of the tongue extends in substantially coplanar relationship with the inside surface of the wall, and terminates at one edge of the tongue along a line disposed at substantially peripherally no greater than that portion of the rim of the aperture formed by one edge of the one wall. The one edge of the tongue is inclined to the plane of the inside surface of the one wall at the line, and forms a corner-like indentation with the one edge of the one wall, the apex of which is disposed on the line. The indentation faces into the chamber so as to be accessible to the pointed tip of a prying tool introduced into the chamber through the front opening of the box, and has means at the apex thereof, at or between the line and the one edge of the one wall, which are readily pierceable by the tip of the tool of enable the tool to be inserted in the aperture from the interior of the chamber and applied against the outer facing surface of the tongue for removal of the tongue. A small tab serves to connect the tongue to the wall structure at one end of the tongue.

For example, the one edge of the tongue may be spaced apart from the one edge of the wall either in the plane of the tongue or perpendicular thereto, at the apex of the identation, so that there is a narrow gap formed therebetween, and the gap may be open to the chamber and the aperture for insertion of the tip of the tool therethrough into the aperture. Alternatively, there may be a thin flashing formed across the gap, which operates to close the gap but which is readily pierceable by the tip of the tool to allow the tip to enter the aperture.

As indicated, the outer facing surface of the tongue is substantially coplanar with the inside surface of the one wall. The term "substantially" is employed to indicate that the surface may be spaced slightly relatively inwardly of the chamber from the plane of the inside surface of the one wall, so that the gap has a small dimensional component normal to the plane. Alternatively, or additionally, the gap may have a component in the direction of the plane, and in fact, the gap may be quite considerable in this direction since there is no loss of enclosure volume as a result. Preferably, however, the gap is kept to a minimum or flashed closed in order to seal the box against dust as indicated.

The aperture may have a rabbet-like set back portion extending about part or all of the inner periphery thereof, with the tongue projecting across the interface between the rabbet-like set back portion and the chamber, so as to closely approach the inner peripheral shoulder of the rabbet to support a flashing extending therebetween. In this way, an undercut effect is achieved whereby the tongue will separate from the wall along a line at the inner peripheral shoulder of the rabbet, the separation being inset in the wall from the rim of the aperture. Also, where the gap is flashed closed, the flashing may extend around the entire perimeter of the tongue to completely seal the tongue to the wall structure or it may be limited to a portion or portions of the perimeter, such as an end edge of the tongue, or opposing side edges of the tongue.

The edge of the tongue may be disposed at an acute angle to the inside surface of the one wall; or it may be disposed at a right angle to the surface. Aslo, the edge may arcuate in plan configuration, or it may be rectangular in plan configuration.

BRIEF DESCRIPTION OF THE DRAWINGS

These features will be better understood by reference to the accompanying drawings which illustrate certain presently preferred embodiment of the invention. In the drawings

FIG. 11 is a part cross-sectional view of another embodiment of the knockout structure showing the mold elements used to form the knockout structure and the adjacent wall structure.

FIG. 12 is a greatly enlarged part cross-sectional view of the knockout structure of FIG. 11 at one side edge of the tongue.

FIG. 13 is similar to FIG. 11 but of a somewhat modified structure.

FIG. 14 is a greatly enlarged part cross-sectional view at one side edge of the tongue of the knockout structure shown in FIG. 13;

FIG. 16 is a part perspective interior view of still another knockout structure;

FIG. 17 is a partial cross sectional view taken along line 17—17 of FIG. 16.

FIG. 18 is a part perspective interior view of a fourth knockout structure;

FIG. 19 is a part cross-sectional view of the structure shown in FIG. 18 taken along the line 19—19 of FIG. 18;

FIG. 20 is a part cross-sectional view of the structure along the line 20—20 of FIG. 19;

FIG. 21 is similar to FIG. 20 but shows the structure in somewhat modified form; and FIG. 22 is a copy of FIG. 8 in the above-cited applications Ser. No. 69,266 and Ser. No. 265,341.

DESCRIPTION OF THE PREFERRED EMBODIMENTS

Figure 1:
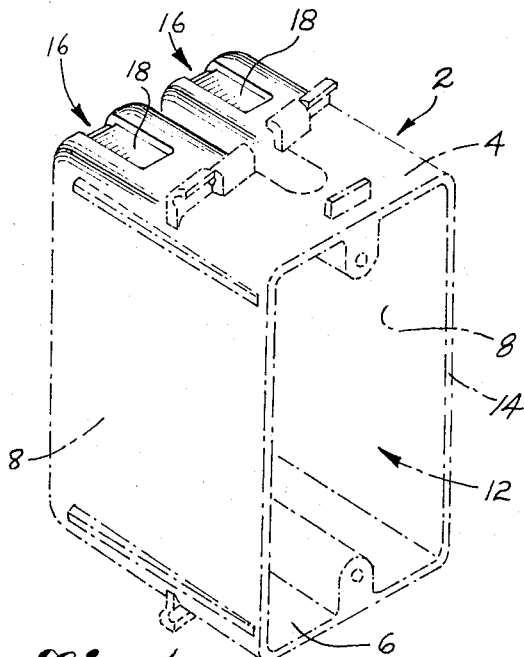
FIG. 1 is a part schematic perspective view of a molded electrical outlet box having a knockout structure therein which incorporates certain of the above-mentioned features of the invention.
Figure 2:
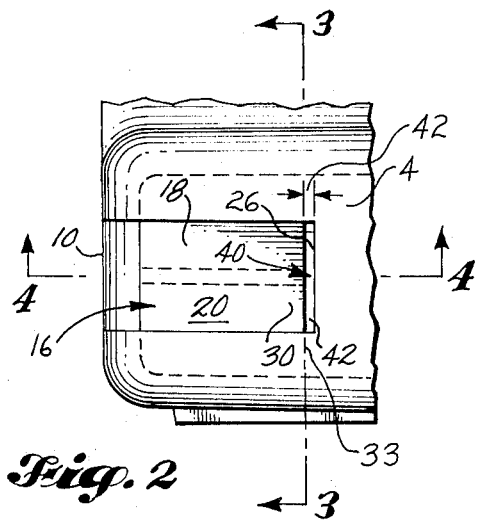
FIG. 2 is a part plan view of the box of FIG. 1 showing a knockout structure in the top wall thereof.
Figure 3:
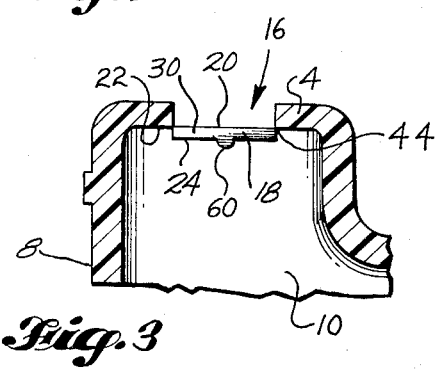
FIG. 3 is a part cross-sectional view of the knockout structure shown in FIG. 2 taken along the line 3—3 of FIG. 2.
Figure 4:
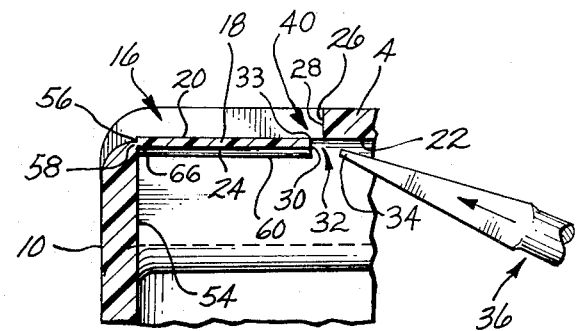
FIG. 4 is another part cross-sectional view of the structure shown in FIG. 2 taken along the line 4—4 of FIG. 2.

Referring to the various embodiments and figures wherein like features bear the same numeral, it will be seen that each outlet box 2 has a multiple-sided wall structure comprised of top wall 4, bottom wall 6, side front-to-rear walls 8, and a back wall 10, which together define a chamber 12 within the box that opens to the ambient surroundings of the box through the front 14 thereof. The box has a pair of apertures 16 in the top wall 4 thereof, and a pair of substantially planiform knockout tongues 18 that project opposite the apertures 16 from the back wall structure 10 so as to substantially close the aperture 16 to the chamber 12. Each tongue 18 is disposed so that the surface 20 thereof, which faces relatively outside of the box at its aperture 16 is substantially coplanar with the inside surface 22 to top wall 4. Each tongue 18 also has a surface 24 thereon which faces relatively inside of the box at the chamber, and is spaced relatively inwardly of the chamber from the plane of the inside surface 22 of the wall 4. The inner and outer facing surfaces 24 and 20 of the tongue terminate at edge surface 30 which is located adjacent the rim 26 of the aperture. Edge surface 30 is disposed at an angle to the inside surface 22 of the wall, so that together the wall surface 22 and the tongue edge surface 30 define a corner-like indentation therebetween, shown generally at 32, the apex of which is disposed along a line 33 (shown in FIG. 2 as coincident with cross-section line 3—3) extending with respect to tongue 18 substantially peripherally no greater than the innermost edge 28 of aperture rim 26. The identation is adapted to receive the pointed tip 34 of a prying tool, such as a straight or bent tipped screwdriver 36 or a chisel 38, and faces into the chamber in a direction accessible by the tool from the front opening 14 of the box. The juncture between wall 4 and tongue end edge surface 30 may be open, as shown in FIGS. 1–5 or flashed closed by a readily pierceable flashing or web 44 as shown in FIGS. 6–19. Thus, the tip 34 of the tool 36 or 38 may be inserted into engagement with surface 30, and then thrust into the aperture 16, and then applied against the outer facing surface 20 of the tongue for removal of the tongue in each of the embodiments shown.

The edge 30 of the tongue and the edge 28 of the wall 4 may coterminate in a thin line with one another at the apex of the indentation or as in several of the illustrated embodiments, the edge 30 of tongue 18 is spaced apart from the edge 28 of the wall 4 at the apex of the indentation, so that there is a narrow gap 42 formed therebetween. In the embodiment of FIGS. 1–5, the gap 42 (FIG. 2) is open to each of the chamber and the aperture, so that the tip of the tool can be inserted therethrough directly into the aperture. In the embodiments of FIGS. 6–21, there is a thin flashing 44 formed, across the gap, between the line 33 and the edge 28, which operates to close the gap but is readily pierceable by the tip of the tool to allow the tip to enter the aperture.

In FIGS. 13, 14 and 18–24, the edge 30 of the tongue and indeed, the whole of the tongue, is spaced slightly relatively inwardly into the chamber 12 from the plane of the inside surface 22 of the wall 4, so that the gap 40 has a small dimensional component 46 normal to the plane. In FIGS. 1–12 and 15–17, the tongue is substantially coplanar with the inner surface 22 and may be spaced apart from the edge 28 of the wall in the plane of the inside surface thereof, so that the gap has a dimensional component 42 or 48 in the direction of the plane. Of course, in the embodiments shown in FIGS. 1–5, 23 and 24, the component 42 is more sizeable and is open to the chamber and the aperture as indicated.

In FIGS. 6–16, where the gap is flashed closed, or in the embodiment specifically shown in FIG. 17 wherein the tongue edges 68 and 69 are coplanar with the aperture faces 70 and 71, respectively, portions of the aperture side rim 27 or 70 and 71 of the wall 4 may have a rabbet 50 about part or all of the inner periphery thereof, with tongue 18 projecting across the interface between the rabbet and the chamber, so as to closely approach the inner peripheral shoulder 52 of the rabbet to support the flashing. In this way, an undercut effect is achieved whereby the tongue will separate from the wall 4 along a line peripherally inset in the wall from the rim 26 of the aperture. The effect may be employed around the entire perimeter of the tongue, for example, in the arcuate knockout tongue shown in FIG. 16, or it may be employed only along the side edges of the tongue, as is shown in FIGS. 6–10. Additionally, an undercut may be used directly behind the tab 76 to control the location of fracture thereof when tongue 18' is removed.

In FIGS. 1–5, the flashing 44 extends around the side perimeter of the tongue. In FIGS. 6–10 and 15, flashing 44 extends around the entire periphery of tongue 18. In the embodiment shown in FIGS. 18–21, the flashing 44 is limited to the projecting end edge 30 of the tongue 18 and the side gap 43 along each of the side edges 45 of the tongue is open to the chamber and the aperture. FIG. 20 shows rib 60 positioned on the inner facing surface 24 of tongue 18 whereas FIG. 21 shows rib 60' positioned on the outer facing surface 20 of tongue 18. For the embodiment shown in FIGS. 16 and 17 the flashing may be limited to tab 76.

Figure 15:
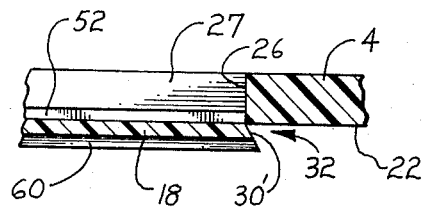
FIG. 15 is a part cross-sectional view similar to that of FIGS. 9 and 10 but showing a somewhat modified tongue end structure.

In FIG. 15, the edge 30' of tongue 18 is disposed at an acute angle to the inside surface 22 of the wall 4, whereas in the other figures it is disposed at a right angle to the surface. Also in FIGS. 16 and 17, the edge 30 is arcuate in plan configuration, whereas in the other figures it is rectangular in plan configuration.

In FIGS. 16 and 17 one of the preferred embodiments of this invention is shown in which knockout tongue 18' has an arcuate end edge 30'. The tongue 18 is attached at its base, along the dead sharp corner 66 in a configuration substantially identical to the manner of attachment shown in FIGS. 1–10, 23 and 24. Edges 68 and 69 of the knockout tongue 18' abut the aperture walls 70 and 71 as shown in FIG. 17. This configuration is obtained by utilizing a mold structure in which the mold faces forming edges 68 and 69 are respectively substantially coplanar with the mold faces forming aperture walls 70 and 71 and the mold face forming knockout tongue outer surface 20' is substantially coplanar with the mold surface forming the inner wall 74. This configuration produces a substantially free standing knockout tongue attached at its base only, however, a minor amount of flashing may extend between the tongue 18' and the adjacent wall 4 at aperture surfaces 70 and 71.

Tab 76 serves to hold the projecting end 30' of the knockout tongue 18' in place and provides a sufficient support to withstand a small force component addressed perpendicular to the tongue.

Tab 76 and runner 60 aid in filling out the tongue 18' during molding as well as providing strength to the tongue and structural attachment to the adjacent wall structure. Tab 76 is readily fractured by use of a tongue removing tool in the process of opening the aperture for insertion of conductors, either by a force applied from outside the box or by manipulation from inside with a chisel or screwdriver.

In all of the illustrated embodiments shown with the exception of FIG. 22, the apertures 16 are disposed in the top back corner of the box, and the back wall 10 coterminates with each tongue 18 at the aperture. Also, the inner facing surface 24 of the tongue forms a dead sharp right angular corner 66 with the inside surface 54 of the back wall, and the outer facing surface 20 of the tongue has a dead sharp right angular step 56 therein which is oppositely disposed to the end edge 30 of the tongue, and generally coplanar with the inside surface 54 of the back wall. In this way, a readily frangible neck 58 is formed between the surfaces 20 and 24 of the tongue at the juncture of the tongue with the wall structure. The neck 58 assures that the tongue will separate from the wall structure substantially in the plane of the inside surface 54 of the back wall. See FIGS. 5 and 10. Common to all embodiments shown is the surface discontinuity or step 56 which provides a line of stress concentration along which the tongue 18 fractures when forced inwardly.

Figure 23:
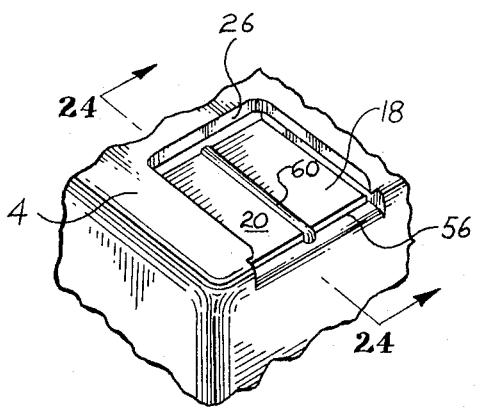
FIG. 23 is another embodiment of the knockout structure of this invention and is a copy of FIG. 2 of the above-cited application Ser. No. 280,720.
Figure 24:
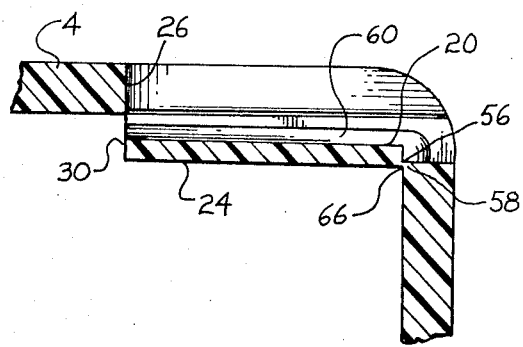
FIG. 24 is a cross-sectional view of the knockout structure shown in FIG. 23 taken along lines 24—24 thereof.

In FIGS. 1–20, the inner facing surface 24 of the tongue has a rib 60 running lengthwise thereof between the plane of the inside surface 54 of the back wall and the end edge 30 of the tongue. In FIGS. 21, 23 and 24, the outer facing surface 20 of the tongue has such a rib. These ribs are important to the molding operation, as explained in application Ser. No. 280,720. They also lend reinforcement to the tongue as explained hereinbefore.

Figure 5:
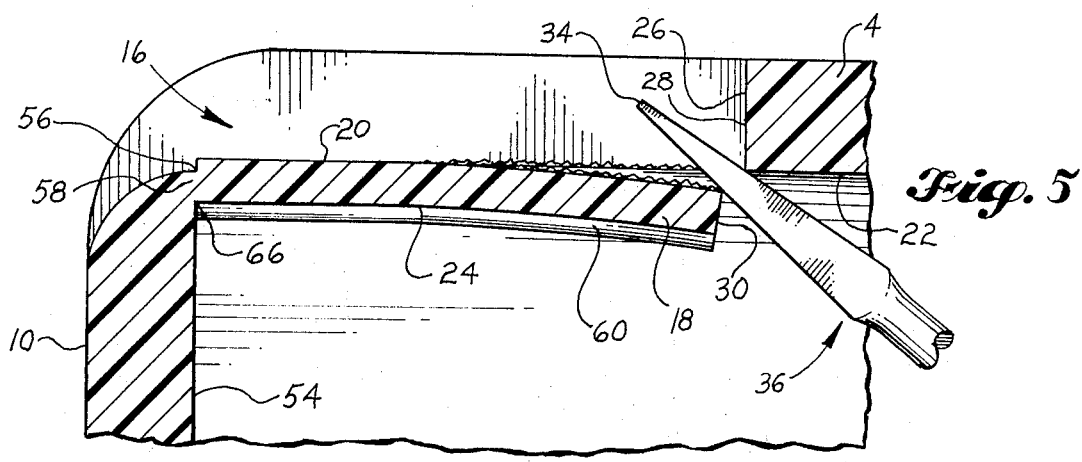
FIG. 5 is similar to FIG. 4 but shows the manner in which the knockout tongue of the structure is separated from the wall structure of the box.
Figure 6:
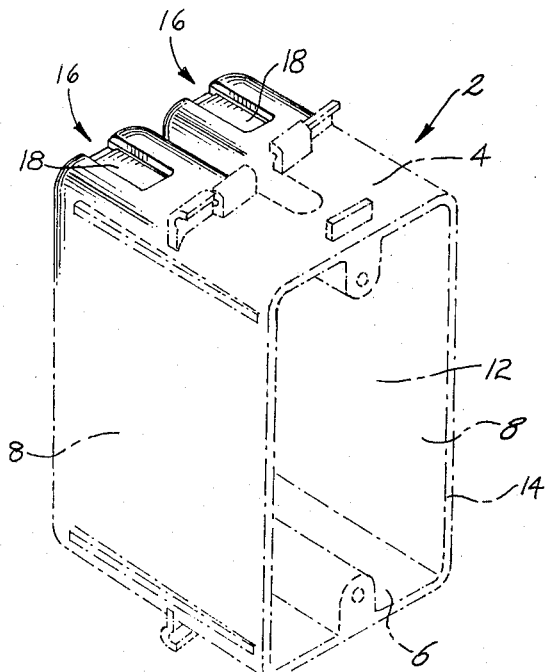
FIG. 6 is a part schematic perspective view of another injection molded box having a somewhat different knockout structure incorporating a rabbet-like undercut in the aperture.
Figure 7:
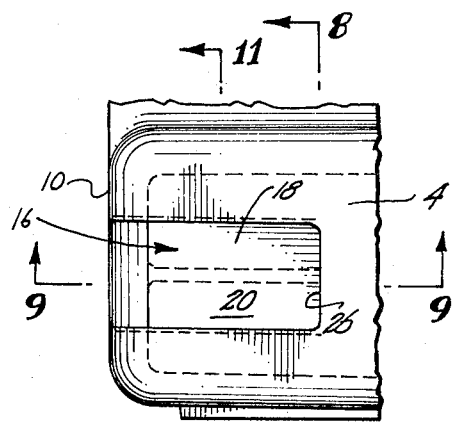
FIG. 7 is a part plan view of the box shown in FIG. 6 showing a knockout structure in the top wall thereof.
Figure 8:
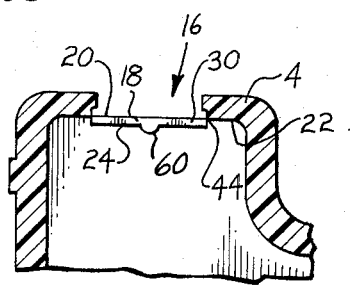
FIG. 8 is a part cross-sectional view of the knockout structure shown in FIG. 7 taken along the line 8—8 of FIG. 7.
Figure 9:
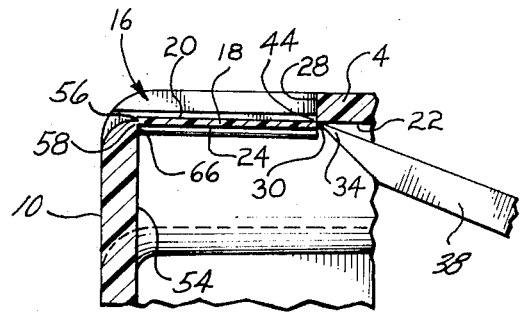
FIG. 9 is a part cross-sectional view of the structure shown in FIG. 7 taken along the line 9—9 of FIG. 7.
Figure 10:
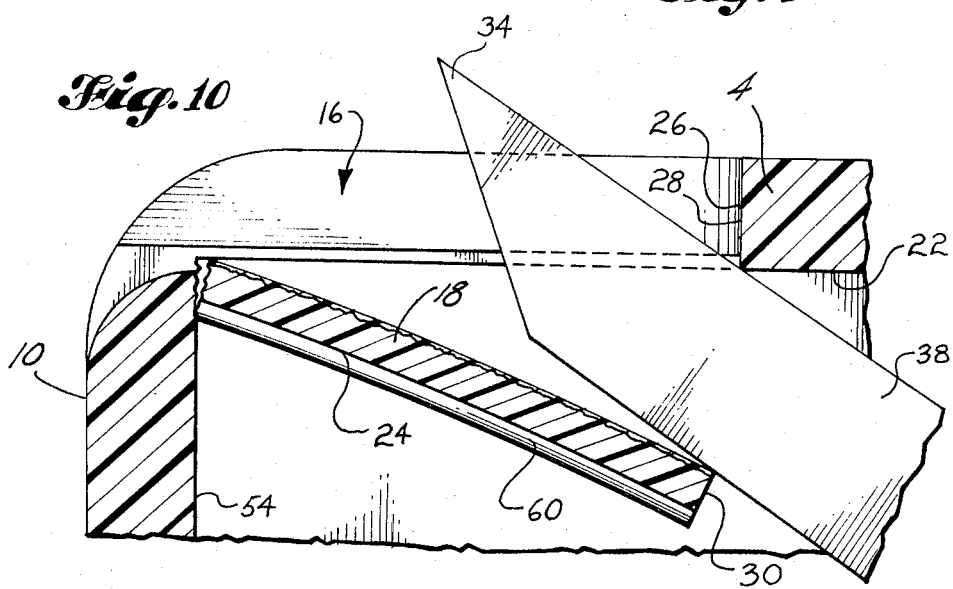
FIG. 10 is similar to FIG. 9 but shows the manner in which the knockout tongue of the structure is separated from the wall structure of the box by manipulation with a prying tool.

If desired the tool may be given a twist to aid in separating the tongue, as illustrated by the arrow 62 in FIG. 5.

In FIG. 22, the shoulder 62 of the step 56 between the outer facing surface 20 of the tongue and the adjoining portion 64 of the outside surface of the box, is similarly oriented to the end edge 30 of the tongue.

Through the use of the various embodiments shown herein the knockout structure having a controlled location for fracture upon manipulation is shown whereby the knockout web or tongue 18 is completely and easily removed, leaving an aperture suitable for insertion of conductors into the electrical enclosure. Those skilled in the art will readily recognize the physical phenomena taught herein and with the aid of the teachings herein, appreciate other embodiments within the scope and intention of this invention. The illustrated embodiments are presently considered to be of optimum form and design to achieve the objectives hereof in a degree which is unique. Thus while the invention broadly embraces a knockout structure particularly suited for use in plastic electrical enclosures which structure contains as a critical feature thereof a stress concentrating surface discontinuity located at the optimum position and oriented so as to cause fracture of the knockout web at a perdetermined location it will be recognized that the provision of a variant form thereof in which the knockout web is substantially coplanar with one wall interior surface and attached thereto by thin flashings is within the invention's scope and spirit. The particular advantages gained by completely or partially sealing the knockout web or tongue to the enclosure wall structure and of having the web or tongue lie in a plane closely adjacent the interior wall of the enclosure can readily be combined with the controlled knockout tongue fracture location to provide a maximization of the available enclosure volume while realizing all the various advantages of this invention. These and other aspects of the invention including equivalents thereof will be apparent from an understanding of the subject matter as disclosed and as set forth in the claims which follow.

We claim:

1. In an electrical outlet box having a wall structure defining front to rear walls and a back wall interconnected therebetween, which together define a chamber within the box that opens to the ambient surroundings of the box through the front thereof, an aperture in one of the aforesaid walls, and a substantially planiform knockout tongue that projects from the wall structure adjacent the aperture, and is disposed so that a surface thereof faces relatively outside of the box at the aperture, and forms a portion of the outside surface of the box, said outer facing surface of the tongue extending in substantially coplanar relationship with the inside surface of the aforesaid one wall, and terminating at one edge of the tongue along a line disposed in a region between that portion of the rim of the aperture formed by one edge of the one wall and an area of said aperture inwardly from said rim, said region including the said rim portion of the aperture, said one edge of the tongue being inclined to the plane of the inside surface of the one wall at the line, and forming a corner-like indentation therewith, the apex of which is disposed on the line, said indentation facing into the chamber so as to be accessible to the pointed tip of a prying tool introduced into the chamber through the front opening of the box.

2. The electrical outlet box according to claim 1 wherein the one edge of the tongue is spaced apart from the one edge of the one wall at the apex of the indentation, so that there is a narrow gap formed therebetween.

3. The electrical outlet box according to claim 2 wherein the gap is open to the chamber and the aperture for insertion of the tip of the tool therethrough into the aperture.

4. An electrical outlet box according to claim 2, including a thin flashing formed across the gap, which operates to close the gap but which is readily pierceable by the tip of the tool.

5. The electrical outlet box according to claim 2 wherein the tongue is spaced apart from the one edge of the one wall in the plane of the inside surface thereof, so that the gap has a dimensional component in the direction of the plane.

6. The electrical outlet box according to claim 5 including a thin flashing formed across the gap, which operates to close the gap but which is readily pierceable by the tip of the tool.

7. The electrical outlet box according to claim 2 wherein there is a thin flashing formed across the gap, and the one edge of the one wall has a rabbet about the inner periphery thereof, and wherein the tongue projects across the interface between the rabbet and the chamber, so as to closely approach the inner peripheral shoulder of the rabbet to support the flashing.

8. The electrical outlet box according to claim 7 wherein the rabbet is disposed along the projecting side edges of the tongue.

9. The electrical outlet box according to claim 2 wherein there is a thin flashing formed across the gap at the projecting end edge of the tongue.

10. The electrical outlet box according to claim 9 wherein the gap along each projecting side edge of the tongue is open to the chamber and the aperture.

11. The electrical outlet box according to claim 1 wherein the one edge of the tongue is disposed at an acute angle to the plane of the inside surface of the one wall.

12. The electrical outlet box according to claim 1 wherein the one edge of the tongue is disposed at a right angle to the plane of the inside surface of the one wall.

13. The electrical outlet box according to claim 1 wherein the one edge of the tongue is arcuate in plan configuration.

14. The electrical outlet box according to claim 1 wherein the one edge of the tongue is rectangular in plan configuration.

15. The electrical outlet box according to claim 1 wherein the aperture is disposed in a corner of the box defined by the one wall and an adjoining wall which coterminates with the tongue at the aperture.

16. In an electrical outlet box having a wall structure defining front to rear walls and a back wall interconnected therebetween, which together define a chamber within the box that opens to the ambient surroundings of the box through the front thereof, an aperture in one of the aforesaid walls, and a substantially planiform knockout tongue that projects from the wall structure adjacent the aperture, and is disposed so that a surface thereof faces relatively outside of the box at the aperture, and forms a portion of the outside surface of the box, said outside surface of the box having a surface discontinuity thereon adjacent the juncture of the outer facing surface of the tongue with the wall structure, whereby the tongue fractures along a line intersecting the discontinuity, when a force is applied to the tongue, crosswise thereof, in the direction of the chamber from the aperture, said tongue including an inner facing surface which faces inside of said box, said inner facing surface having a rib raised thereon which extends transversely of the tongue.

17. In an electrical outlet box having a wall structure defining front to rear walls and a back wall interconnected therebetween, which together define a chamber within the box that opens to the ambient surroundings of the box through the front thereof, an aperture in one of the aforesaid walls, and a substantially planiform knockout tongue that projects from the wall structure adjacent the aperture, and is disposed so that a surface thereof faces relatively outside of the box at the aperture, and forms a portion of the outside surface of the box, said outside surface of the box having an indentation formed therein, adjacent the juncture of the outer facing surface of the tongue with the wall structure, whereby the tongue fractures along a line intersecting the indentation, when a force is applied to the tongue, crosswise thereof, in the direction of the chamber from the aperture, said tongue including an inner facing surface which faces inside of said box at the chamber and forms a corner with the wall structure adjacent the juncture of the tongue with said wall, one of said inner and outer facing surfaces of the tongue having a rib raised thereon which extends transversely of said tongue.

18. In an electrical outlet box having a wall structure defining front to rear walls and a back wall interconnected therebetween defining a chamber within said box open through the front thereof, an aperture formed in one of said walls, a planiform knockout tongue removably mounted across said aperture to provide a substantial barrier to communication therethrough, the otuer facing surface of said tongue being substantially coplanar with the inner facing surface of said wall in which said aperture is formed, a forward edge of said tongue facing the open front of said box, said forward edge being disposed at a right angle to the plane of the inside surface of said wall in which said aperture is formed.

19. In an electrical outlet box having a wall structure defining front to rear walls and a back wall interconnected therebetween defining a chamber within said box open through the front thereof, an aperture formed in one of said walls, a planiform knockout tongue removably mounted across said aperture to provide a substantial barrier to communication therethrough, the outer facing surface of said tongue being substantially coplanar with the inner facing surface of said wall in which said aperture is formed, a forward edge of said tongue facing the open front of said box, said forward edge being disposed at an acute angle to the plane of the inside surface of said wall in which said aperture is formed.

20. In an electrical outlet box having a wall structure defining front to rear walls and a back wall interconnected therebetween defining a chamber within said box open through the front thereof, an aperture formed in one of said walls, a planiform knockout tongue removably mounted across said aperture to provide a substantial barrier to communication therethrough, the outer facing surface of said tongue being substantially coplanar with the inner facing surface of said wall in which said aperture is formed, a forward edge of said tongue facing the open front of said box, said forward edge of said tongue and the corresponding edge of said aperture being spaced apart to provide a gap therebetween coplanar with the outer facing surface of said tongue and with the inner facing surface of said wall in which said aperture is formed.

21. In an electrical outlet box having a wall structure defining front to rear walls and a back wall interconnected therebetween defining a chamber within said box open through the front thereof, an aperture formed in one of said walls, a planiform knockout tongue removably mounted across said aperture to provide a substantial barrier to communication therethrough, the outer facing surface of said tongue lying in a plane spaced inwardly from and substantially parallel to the plane of the inner surface of said wall in which said aperture is formed, a forward edge of said tongue facing the open front of said box, a gap between said inner facing surface of said wall and said outer facing surface of said tongue along said forward edge thereof, the width of said gap between said inner and outer facing surfaces being at least as great as the corresponding tip dimension of a prying tool for entry therein, including a thin flashing formed across said gap for closure thereof, said flashing being readily pierceable by the tip of said prying tool.

* * * * *